R. E. CECIL & H. E. GRANT.
SPRAYING APPARATUS.
APPLICATION FILED JAN. 17, 1912.

1,194,358.

Patented Aug. 15, 1916.

WITNESSES
INVENTORS
Robert E. Cecil
Horace E. Grant

UNITED STATES PATENT OFFICE.

ROBERT E. CECIL, OF SEWICKLEY, AND HORACE E. GRANT, OF PITTSBURGH, PENNSYLVANIA.

SPRAYING APPARATUS.

1,194,358.  Specification of Letters Patent.  Patented Aug. 15, 1916.

Application filed January 17, 1912. Serial No. 671,594.

*To all whom it may concern:*

Be it known that we, ROBERT E. CECIL and HORACE E. GRANT, respectively of Sewickley and Pittsburgh, in the county of Allegheny and State of Pennsylvania, have invented certain new and useful Improvements in Spraying Apparatus, of which the following is a specification.

An object of our invention is to provide a new and improved spraying apparatus including positively operable means for introducing a fluid under a substantially constant and uniform pressure to a tank containing a spraying liquid and utilizing said compressed fluid for continuously agitating the contained liquid and discharging the same from the tank.

A further object of the present invention is the provision of an apparatus of the character described having positively operable means for maintaining a substantially constant and uniform pressure within the liquid containing tank, whereby the compressed gas and liquid are simultaneously passed from the tank to a spraying nozzle and discharged therefrom in the form of fine, constant, and uniform spray.

Figure 1:
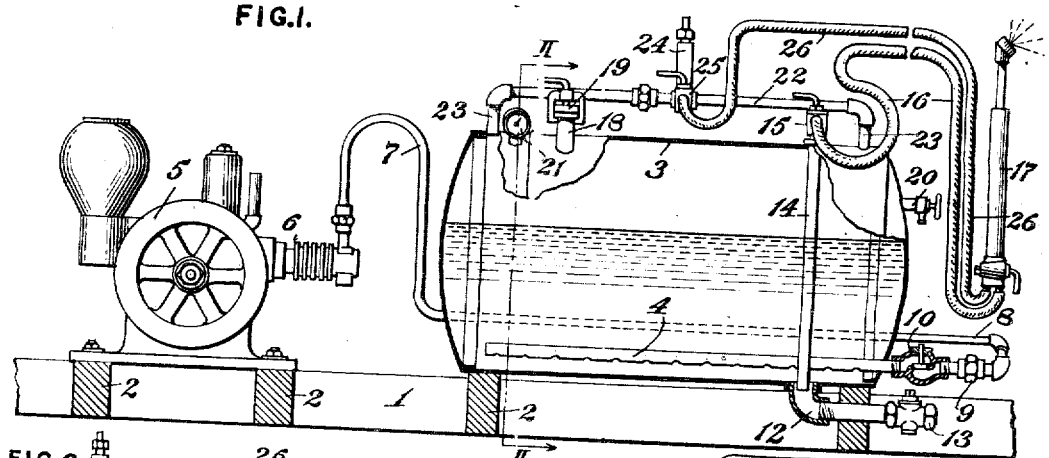
Figure 2:
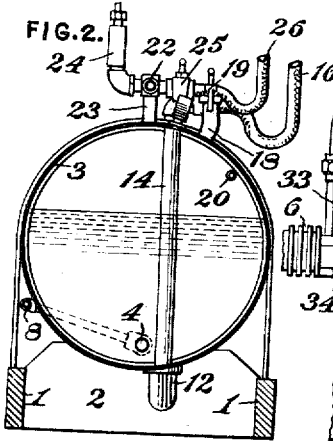
Figure 3:
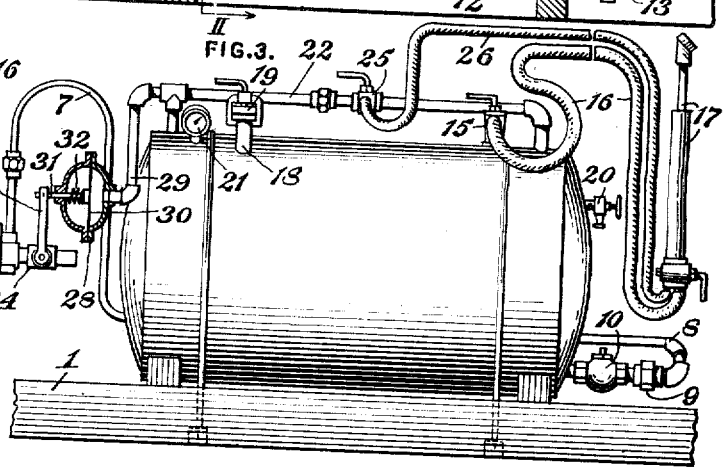
Figure 4:
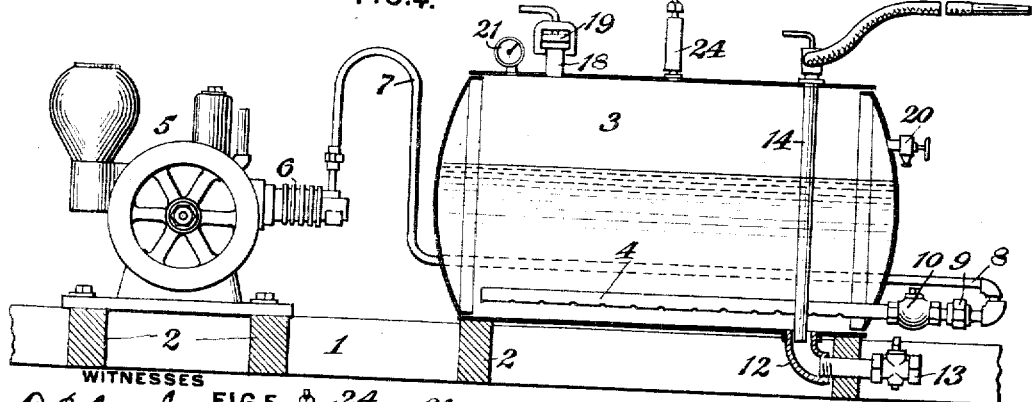

In the accompanying drawing, which illustrates applications of our invention, Figure 1 is a part side elevational view and a part sectional view of a spraying apparatus constructed in accordance with our invention; Fig. 2, a vertical sectional view taken on line II—II of Fig. 1 looking in the direction of the arrows; Fig. 3, a side elevational view of the form of our apparatus shown by Fig. 1 showing a modified form of construction for regulating and controlling the fluid pressure; Fig. 4, a side elevational view showing an embodiment of our invention designed to be used without conveying the air to the spraying nozzle; and Fig. 5, a detail elevational view showing a plurality of pipes for conveying liquid and the compressed gas to a plurality of nozzles.

Referring to the drawing, and first to the form of Fig. 1, the apparatus is mounted on a suitable framework comprising longitudinally extending members 1 and transversely extending members 2. The spraying apparatus, as illustrated and as preferred, comprises an air tight steel tank 3 in which is located a perforated pipe 4 having one end thereof projecting through a head of the tank. 5 designates a gasolene motor, and 6, a compressor.

Air or other fluid under pressure is introduced to the interior of the tank from the compressor through a perforated pipe 4 by means of a system of piping preferably comprising a U-shaped bent portion 7, a horizontal portion 8, a union 9, and a check valve 10. By means of the positively operable mechanism set forth, we are enabled to supply a constant and uniform quantity of air or other fluid under pressure to the interior of the liquid containing tank, and further to provide for a thorough and continuous agitation of the liquid contained in the tank, and a simultaneous discharge of both liquid and air from the tank under a comparatively low pressure.

Located at the bottom of the tank and secured thereto by a coupling member 11 is a drain pipe 12 having a drain cock 13 and extending downwardly through the tank and having its lower end entered in the coupling member 11 is a dip pipe 14.

It will be noted that the lower end of pipe 14 extends for a slight distance below the bottom of the tank, and by this construction, we are enabled to remove the entire contents of the tank. In addition, the particular location of the inlet end of pipe 14 provides additional advantages, in that the pipe 14 provides a means for producing an annular passageway between it and the drain pipe 12 of restricted area, and also, through the presence of the open end of said pipe at this point, enables the latter to be readily cleaned without removing the pipe.

15 designates a cock secured to the upper end of pipe 14 to which is secured a flexible hose 16 leading therefrom to a spray nozzle 17. The tank is filled through a pipe 18 having a suitable closing cap 19, and 20 designates a cock which, when opened, acts as a telltale when the tank is filled to the desired level.

21 designates a pressure gage.

The air under pressure after its travel through the tank escapes through an anti-priming device comprising a horizontal portion 22 in communication with the interior of the tank by means of pipes 23.

24 designates a relief valve in communication with the tank through the anti-priming device, and 25 a cock in communication with the horizontal portion and with a flexible pipe 26 leading therefrom to the spraying nozzle. By this arrangement the actual entrance for the air from the tank to pipe 26 is shifted to a point corresponding to the position of valve 25, although the structural entrance is at the inlet ends of pipes 23, it being readily understood that tilting of the tank sufficient to cover the entrance to either pipe 23 leaves the entrance of the other pipe free for the passage of air to the pipe 26. There is, therefore, practically no liability of the air supply for the spraying device being cut off in use, an advantage of especial importance where the apparatus is mounted on wheels for use in orchards, etc., tilting of the tank due to sloping ground surfaces or splashing of the tank contents due to uneven surfaces, being ineffective to entirely close this air supply unless these conditions are such as would prevent the use of the apparatus otherwise.

In Fig. 3, we have shown a modified form of means for controlling the pressure within the tank; in this form of our invention, in place of the relief valve in communication with the anti-priming means, we provide means for cutting off the supply of air to the compressor, thereby controlling the amount of compressed air supplied to the tank. These means, as illustrated, comprise a casing 28 in communication with the horizontal pipe of the anti-priming means by a pipe 29, a diaphram 30 within the casing, a rod 31, a spring 32, said rod being connected with an operating lever 33 of a valve device 34 through which air is introduced to the compressor.

Figure 5:
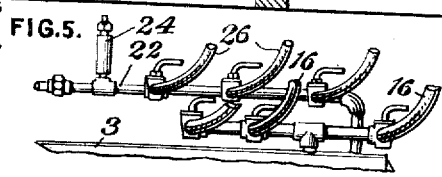

As illustrated by Fig. 5, it is our idea to employ means for supplying the compressed gas and the liquid at will to a plurality of nozzles, not shown, so that two or more may be simultaneously operated.

In the form of Fig. 4, the relief valve 24 is applied directly to the tank.

By means of the apparatus constituting our invention, we are enabled to provide a constant and uniform spray regardless of the number of spraying nozzles employed or the varying quantities of air and liquid discharged from the tank due to the cutting off of the suppy to one or more nozzles. Owing, however, to varying quantities of air and liquid discharged from the tank and further to the fact that the tank is supplied with a substantially constant and uniform quantity of air from the compressor, means should be provided for regulating the pressure within the tank.

In the forms of our invention as illustrated we have shown two forms of automatically operable means for controlling the pressure within the tank, we do not desire, however, to limit our invention to the pressure controlling means shown.

By means of the invention thus disclosed an apparatus is provided wherein not only a constant pressure is maintained, but the spraying fluid is constantly agitated. This is important for the reasons that the chemicals forming a part of the spraying fluid are largely non-soluble and must be supported in the liquid in a uniform manner in order to maintain a spraying fluid of uniform character, strength, and efficiency.

What we claim is:

1. In a spraying apparatus and in combination, a liquid containing tank, means for introducing air under pressure to said tank, a drain pipe at the bottom of the tank, an open-ended upwardly extending liquid discharge pipe having its inlet end within the drain pipe, and a nozzle operatively connected to said discharge pipe.

2. In a spraying apparatus and in combination, a liquid containing tank, means for introducing air under pressure to said tank, a drain pipe at the bottom of the tank and extending below the same, an open-ended liquid discharge pipe of less diameter than the drain pipe and extending through said tank and entering said drain pipe, a nozzle, and a hose connection between said discharge pipe and the nozzle.

3. In a spraying apparatus and in combination, a liquid containing tank, means for introducing air under pressure to said tank, a drain pipe at the bottom of the tank and extending below the same, an open-ended liquid discharge pipe of less diameter than the drain pipe and extending through said tank, said means being in the form of a nozzle, and a hose connection between said discharge pipe and the nozzle, said means being in the form of a unit embodying an air-forcing device and mechanism for operating said device.

4. In a spraying apparatus and in combination, a liquid containing tank, means for introducing air under pressure to said tank, a drain pipe at the bottom of the tank and extending below the same, an open-ended liquid discharge pipe of less diameter than the drain pipe and extending through said tank and entering said drain pipe, a nozzle, and a hose connection between said discharge pipe and the nozzle, and an air discharge device in communication with said tank, said means being in the form of a unit embodying an air-forcing device and mechanism for operating said device.

5. In a spraying apparatus and in combination, a liquid containing tank having a controllable open-ended vertically-extending liquid discharge pipe, and also having an air discharge pipe adapted to coöperate with the liquid pipe in producing the spray, a drain pipe positioned relative to the open end of the discharge pipe to permit ready access thereto through the drain pipe, means for introducing air under pressure within said tank, and a supporting frame for said tank and means.

6. In a spraying apparatus and in combination, a liquid containing tank having a controllable open-ended vertically extending liquid discharge pipe, and also having an air discharge pipe adapted to coöperate with the liquid pipe in producing the spray, a drain pipe positioned relative to the open end of the discharge pipe to permit ready access thereto through the drain pipe, means for introducing air under pressure within said tank, and a supporting frame for said tank and means, said means being in the form of a unit embodying an air-forcing device and mechanism for operating said device.

7. In apparatus of the character described, a liquid containing tank, a liquid discharge outfit, means for providing an air pressure in said tank to discharge the liquid through said outlet, and an air discharge structure open to said tank above the liquid level, the discharged air serving as a liquid atomizing element in the spraying operation, said air discharge structure being adapted to prevent closing of the air channel to the passage of air due to tilting of the tank or splashing of its contents.

8. In apparatus of the character described, a liquid containing tank having independent air and liquid discharge outlets, a motor operated air compressor, connections between the compressor and said tank, and means operated solely by the pressure within the tank for regulating the supply of air to the compressor to maintain a substantially uniform predetermined pressure within the tank.

In testimony whereof we affix our signatures in presence of two witnesses.

ROBERT E. CECIL.
HORACE E. GRANT.

Witnesses:
W. G. DOOLITTLE,
F. E. GAITHER.

for introducing air under pressure within said tank, and a supporting frame for said tank and means.

6. In a spraying apparatus and in combination, a liquid containing tank having a controllable open-ended vertically extending liquid discharge pipe, and also having an air discharge pipe adapted to coöperate with the liquid pipe in producing the spray, a drain pipe positioned relative to the open end of the discharge pipe to permit ready access thereto through the drain pipe, means for introducing air under pressure within said tank, and a supporting frame for said tank and means, said means being in the form of a unit embodying an air-forcing device and mechanism for operating said device.

7. In apparatus of the character described, a liquid containing tank, a liquid discharge outfit, means for providing an air pressure in said tank to discharge the liquid through said outlet, and an air discharge structure open to said tank above the liquid level, the discharged air serving as a liquid atomizing element in the spraying operation, said air discharge structure being adapted to prevent closing of the air channel to the passage of air due to tilting of the tank or splashing of its contents.

8. In apparatus of the character described, a liquid containing tank having independent air and liquid discharge outlets, a motor operated air compressor, connections between the compressor and said tank, and means operated solely by the pressure within the tank for regulating the supply of air to the compressor to maintain a substantially uniform predetermined pressure within the tank.

In testimony whereof we affix our signatures in presence of two witnesses.

ROBERT E. CECIL.
HORACE E. GRANT.

Witnesses:
W. G. DOOLITTLE,
F. E. GAITHER.

---

Corrections in Letters Patent No. 1,194,358.

It is hereby certified that in Letters Patent No. 1,194,358, granted August 15, 1916, upon the application of Robert E. Cecil, of Sewickley, and Horace E. Grant, of Pittsburgh, Pennsylvania, for an improvement in "Spraying Apparatus," errors appear in the printed specification requiring correction as follows: Page 2, line 102, claim 3, strike out the comma and the words, ", said means being in the form of" and insert the words and comma *and entering said drain pipe,;* page 3, line 21, claim 7, for the word "outfit" read *outlet;* and that the said Letters Patent should be read with these corrections therein that the same may conform to the record of the case in the Patent Office.

Signed and sealed this 5th day of September, A. D., 1916.

[SEAL.]

F. W. H. CLAY,
*Acting Commissioner of Patents.*

Cl. 137—67.

It is hereby certified that in Letters Patent No. 1,194,358, granted August 15, 1916, upon the application of Robert E. Cecil, of Sewickley, and Horace E. Grant, of Pittsburgh, Pennsylvania, for an improvement in "Spraying Apparatus," errors appear in the printed specification requiring correction as follows: Page 2, line 102, claim 3, strike out the comma and the words, ", said means being in the form of" and insert the words and comma *and entering said drain pipe,;* page 3, line 21, claim 7, for the word "outfit" read *outlet;* and that the said Letters Patent should be read with these corrections therein that the same may conform to the record of the case in the Patent Office.

Signed and sealed this 5th day of September, A. D., 1916.

[SEAL.]

F. W. H. CLAY,
*Acting Commissioner of Patents.*

Cl. 137—67.